United States Patent
Suryanarayana et al.

(10) Patent No.: US 10,146,625 B2
(45) Date of Patent: Dec. 4, 2018

(54) SYSTEMS AND METHODS FOR INTELLIGENT DATA MANAGER FOR OFFLOADING OF BULK DATA TRANSFERS

(71) Applicant: Dell Products L.P., Round Rock, TX (US)

(72) Inventors: Shekar Babu Suryanarayana, Bangalore (IN); Balaji Bapu Gururaja Rao, Austin, TX (US); Chidambara Murthy Shashikiran, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 459 days.

(21) Appl. No.: 14/925,151

(22) Filed: Oct. 28, 2015

(65) Prior Publication Data

US 2017/0124072 A1    May 4, 2017

(51) Int. Cl.
  *G06F 17/30*   (2006.01)
  *G06F 11/14*   (2006.01)
  *H04L 29/06*   (2006.01)
  *H04L 29/08*   (2006.01)

(52) U.S. Cl.
  CPC .............. *G06F 11/14* (2013.01); *H04L 67/06* (2013.01); *H04L 69/16* (2013.01); *G06F 17/30174* (2013.01); *G06F 17/30321* (2013.01); *H05K 999/99* (2013.01)

(58) Field of Classification Search
  CPC ......... G06F 17/30182; G06F 17/30194; G06F 17/30091; G06F 17/302; G06F 17/30283; G06F 17/30321; G06F 9/4406; G06F 11/2082; G06F 17/30174; G06F 17/30212; H04L 69/16; H04L 67/06; H04L 67/1095
  See application file for complete search history.

(56) References Cited

U.S. PATENT DOCUMENTS 6,330,615 B1 * 12/2001 Gioquindo ........ H04L 29/12009
                                              709/236
7,240,240 B2 *  7/2007 Balakrishnan ........ G06F 9/4812
                                              714/15
8,411,560 B2 *  4/2013 Samuels ................. H04L 69/16
                                              370/229

(Continued)

*Primary Examiner* — Merilyn Nguyen
(74) *Attorney, Agent, or Firm* — Jackson Walker L.L.P.

(57) ABSTRACT

A physical storage controller may be configured to: (i) in connection with a command to copy data from an information handling system to a second information handling system communicatively coupled to the information handling system via a network, receive file system metadata of a storage resource of the information handling system from an application-level protocol executing on an information handling system to which the physical storage controller is integral; (ii) construct controller mega-data from the file system metadata; (iii) construct a plurality of datagrams comprising one or more of the controller mega-data, the file system metadata, and data to be copied from the information handling system to the second information handling system; (iv) communicate the plurality of datagrams to a second physical storage controller of the second information handling system independent from any operating system executed on the information handling system.

16 Claims, 10 Drawing Sheets

(56) References Cited

U.S. PATENT DOCUMENTS

| | | | |
|---|---|---|---|
| 8,787,572 B1* | 7/2014 | Tewari | H04L 9/0841 |
| | | | 370/401 |
| 9,015,167 B1* | 4/2015 | Ballou | G06F 17/30321 |
| | | | 707/741 |
| 9,274,710 B1* | 3/2016 | Oikarinen | G06F 3/061 |
| 9,680,869 B2* | 6/2017 | Buruganahalli | H04L 63/166 |
| 9,792,242 B2* | 10/2017 | Krishnamurthy | G06F 13/4045 |
| 2004/0090643 A1* | 5/2004 | Ochi | H04N 1/00204 |
| | | | 358/1.13 |
| 2011/0047372 A1* | 2/2011 | Ganesan | H04L 63/061 |
| | | | 713/155 |
| 2014/0214888 A1* | 7/2014 | Marquardt | G06F 17/30477 |
| | | | 707/769 |
| 2015/0278243 A1* | 10/2015 | Vincent | G06F 17/30194 |
| | | | 707/634 |
| 2016/0239314 A1* | 8/2016 | Suryanarayana | H04L 69/16 |
| 2017/0171606 A1* | 6/2017 | Lee | H04N 21/4384 |
| 2017/0315876 A1* | 11/2017 | Dornquast | G06F 17/30174 |

\* cited by examiner

SYSTEMS AND METHODS FOR INTELLIGENT DATA MANAGER FOR OFFLOADING OF BULK DATA TRANSFERS

TECHNICAL FIELD

The present disclosure relates in general to information handling systems, and more particularly to transfer of data between storage devices associated with information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In many computing applications, information handling systems store massive amounts of data, and such information handling systems must often be capable of providing continuity of access to such data, including access when an operating system associated with a storage array experiences fault or failure. For example, it may be desirable that such systems provide for continuity of a large bulk transfer of data even when an operating system initiating the bulk transfer has experiences a failure.

SUMMARY

In accordance with the teachings of the present disclosure, the disadvantages and problems associated with existing approaches to data transfer may be reduced or eliminated.

In accordance with embodiments of the present disclosure, an information handling may include a processor, a program of instructions implementing an application-level protocol, and a physical storage controller. The program of instructions may be embodied in a computer-readable medium and configured to, when read and executed by the processor: (i) responsive to a command to copy data from the information handling system to a second information handling system communicatively coupled to the information handling system via a network, retrieve file system metadata of a storage resource of the information handling system; and (ii) communicate the file system metadata to a physical storage controller communicatively coupled to the processor. The physical storage controller may configured to: (i) receive the file system metadata; (ii) construct controller mega-data from the file system metadata; (iii) based on the controller mega-data, construct a plurality of datagrams comprising one or more of the controller mega-data, the file system metadata, and data to be copied from the information handling system to the second information handling system; and (iv) communicate the plurality of datagrams to a second physical storage controller of the second information handling system independent from any operating system executed on the information handling system.

In accordance with these and other embodiments of the present disclosure, a method may include responsive to a command to copy data from an information handling system to a second information handling system communicatively coupled to the information handling system via a network, retrieving by an application-level protocol file system metadata of a storage resource of the information handling system. The method may also include communicating the file system metadata to a physical storage controller communicatively coupled to the processor. The method may further include constructing, by the physical storage controller, controller mega-data from the file system metadata. The method may additionally include based on the controller, mega-data, constructing, by the physical storage controller a plurality of datagrams comprising one or more of the controller mega-data, the file system metadata, and data to be copied from the information handling system to the second information handling system. The method may also include communicating, by the physical storage controller, the plurality of datagrams to a second physical storage controller of the second information handling system independent from any operating system executed on the information handling system.

In accordance with these and other embodiments of the present disclosure, a physical storage controller may be configured to, in connection with a command to copy data from an information handling system to a second information handling system communicatively coupled to the information handling system via a network, receive file system metadata of a storage resource of the information handling system from an application-level protocol executing on an information handling system to which the physical storage controller is integral. The physical storage controller may also be configured to construct controller mega-data from the file system metadata. The physical storage controller may further be configured to based on the controller mega-data, construct a plurality of datagrams comprising one or more of the controller mega-data, the file system metadata, and data to be copied from the information handling system to the second information handling system. The storage controller may additionally be configured to communicate the plurality of datagrams to a second physical storage controller of the second information handling system independent from any operating system executed on the information handling system.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 7, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input and output ("I/O") devices, such as a keyboard, a mouse, and a video display. The information handling system may also include one or more buses operable to transmit communication between the various hardware components.

For the purposes of this disclosure, information handling resources may broadly refer to any component system, device or apparatus of an information handling system, including without limitation processors, buses, memories, input-output devices and/or interfaces, storage resources, network interfaces, motherboards, electro-mechanical devices (e.g., fans), displays, and power supplies.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory ("RAM"), read-only memory ("ROM"), electrically erasable programmable read-only memory ("EEPROM"), and/or flash memory; as well as communications media such as wires, optical fibers, microwaves, radio waves, and other electromagnetic and/or optical carriers; and/or any combination of the foregoing.

Information handling systems often use an array of physical storage resources (e.g., disk drives), such as a Redundant Array of Independent Disks ("RAID"), for example, for storing information. Arrays of physical storage resources typically utilize multiple disks to perform input and output operations and can be structured to provide redundancy which may increase fault tolerance. Other advantages of arrays of physical storage resources may be increased data integrity, throughput and/or capacity. In operation, one or more physical storage resources disposed in an array of physical storage resources may appear to an operating system as a single logical storage unit or "logical unit." Implementations of physical storage resource arrays can range from a few physical storage resources disposed in a chassis, to hundreds of physical storage resources disposed in one or more separate storage enclosures.

Figure 1:
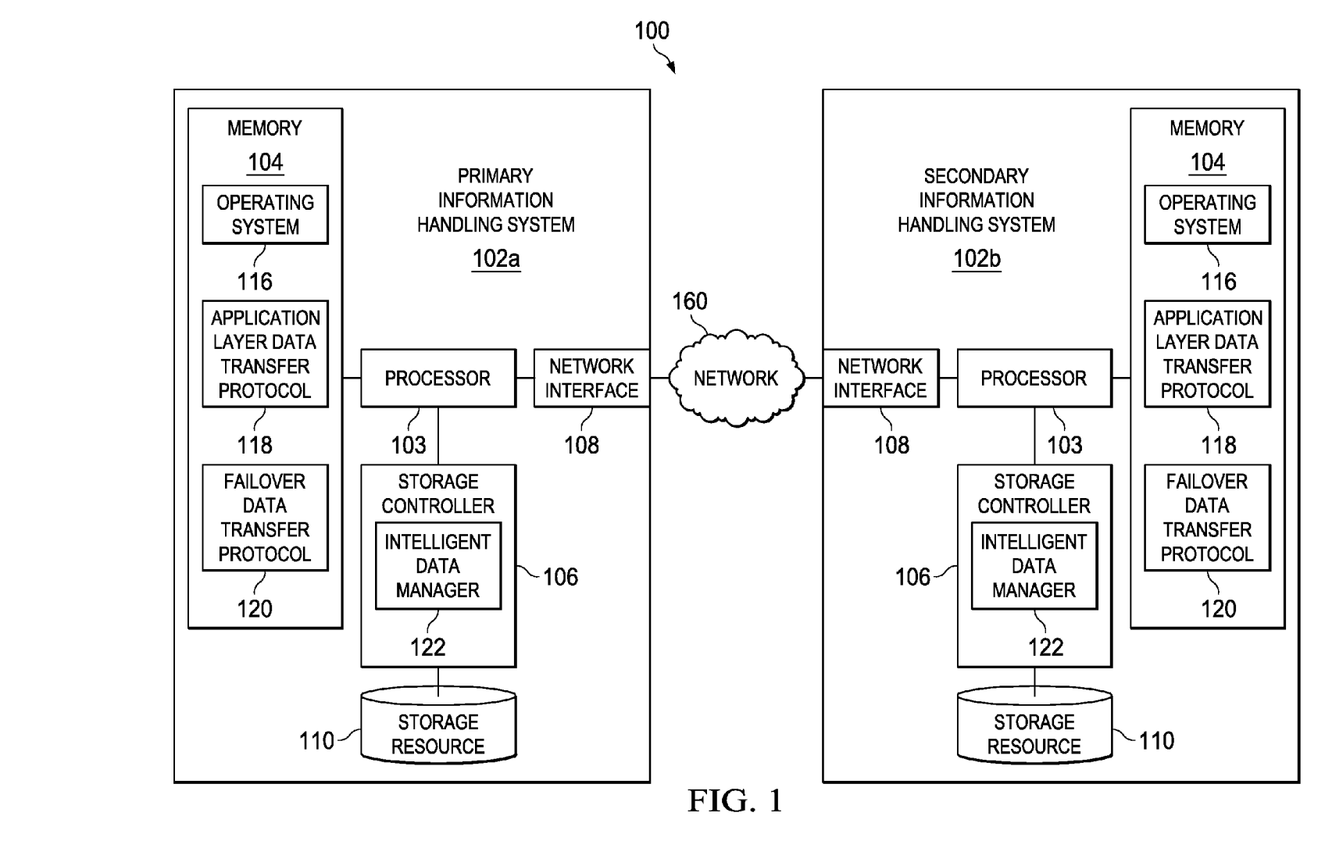
FIG. 1 illustrates a block diagram of a system of information handling resources, in accordance with embodiments of the present disclosure.

FIG. 1 illustrates a block diagram of a system of information handling resources, in accordance with embodiments of the present disclosure. As shown in FIG. 1, system 100 may include a plurality of information handling systems 102 (e.g., information handling systems 102*a*, 102*b*) coupled to one another via a network 160. In some embodiments, an information handling system 102 may comprise a server. In these and other embodiments, an information handling system 102 may comprise a personal computer. In other embodiments, an information handling system 102 may be a portable computing device (e.g., a laptop, notebook, tablet, handheld, smart phone, personal digital assistant, etc.). As depicted in FIG. 1, an information handling system 102 may include a processor 103, a memory 104 communicatively coupled to processor 103, a storage controller 106 communicatively coupled to processor 103, a storage resource 110 communicatively coupled to storage controller 106, and a network interface 108 communicatively coupled to processor 103.

A processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, storage resource 110, and/or another component of information handling system 102.

A memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 116. Operating system 116 may comprise any program of executable instructions, or aggregation of programs of executable instructions, configured to manage and/or control the allocation and usage of hardware resources such as memory, processor time, disk space, and input and output devices, and provide an interface between such hardware resources and application programs hosted by operating system 116. Active portions of operating system 116 may be transferred to memory 104 for execution by processor 103. Although operating system 116 is shown in FIG. 1 as stored in memory 104, in some embodiments operating system 116 may be stored in storage media accessible to processor 103 (e.g., storage resource 110), and active portions of operating system 116 may be transferred from such storage media to memory 104 for execution by processor 103.

Also as shown in FIG. 1, operating system 116 may include an application layer data transfer protocol 118 and a failover data transfer protocol 120. Application layer data transfer protocol 118 may comprise any suitable application-layer network protocol for transferring data between information handling systems 102. For example, application layer data transfer protocol 118 may comprise Network File System (NFS), Common Internet File System (CIFS), File Transfer Protocol (FTP), Hypertext Transfer Protocol (HTTP), or other application-layer protocol. Failover data transfer protocol 120 may comprise, as described in greater detail below, an application-level network protocol that may operate in conjunction with or in lieu of application layer data transfer protocol 118 in order to enable an uninterrupted and operating system independent data transfer over a network via storage controller 106.

Storage controller 106 may include any system, apparatus, or device operable to manage the communication of data between processor 103 and storage resource 110. In certain embodiments, storage controller 106 may provide functionality including, without limitation, disk aggregation and redundancy (e.g., RAID), I/O routing, and error detection and recovery. Storage controller 106 may also have features supporting shared storage and high availability. In some embodiments, storage controller 106 may comprise a PowerEdge RAID Controller (PERC) manufactured by Dell Inc.

As shown in FIG. 1, storage controller 106 may comprise an intelligent data manager 122. Intelligent data manager 122 may comprise any suitable system, device, or apparatus configured to provide a bridge of data among host, redundancy control (e.g., Redundant Array of Inexpensive Disks, or "RAID," control) storage, and network interfaces. Thus, intelligent data manager 122 may provide a bridge among: a host interface of storage controller 106 that provides an interface between storage controller 106 and processor 103, a RAID engine of storage controller 106 for controlling and maintaining RAIDs of storage resource 110, a storage interface (e.g., Serial-Attached Small Computer Systems Interface or "SAS" interface) between storage controller 106 and storage resource 110, and/or network interface 108. Intelligent data manager 122 may be implemented in firmware, software, hardware, or any combination thereof. For example, in some embodiments, intelligent data manager may be embodied in a program of instructions (e.g., firmware or software) which may be read and executed by control logic of storage controller 106. Functionality of intelligent data manager 122 may be described in greater detail below.

Network interface 108 may comprise any suitable system, apparatus, or device operable to serve as an interface between an information handling system 102 to one or more other information handling systems via network 160. Network interface 108 may enable information handling system 102 to communicate using any suitable transmission protocol and/or standard. In these and other embodiments, network interface 108 may comprise a network interface card, or "NIC." In other embodiments, network interface 108 may be implemented as a virtual NIC (e.g., implemented by software configured to execute on processor 103 of information handling system 102). As shown in FIG. 1, network interface 108 is shown as a component separate from storage controller 106. In some embodiments, network interface 108 may be integral to storage controller 106.

A storage resource 110 may include one or more hard disk drives, magnetic tape libraries, optical disk drives, magneto-optical disk drives, compact disk drives, compact disk arrays, disk array controllers, and/or any other system, apparatus or device operable to store media. In some embodiments, storage resource 110 may comprise a plurality of physical storage resources that may appear to an operating system or virtual machine executing on information handling system 102 as a single logical storage unit or virtual storage resource. For example, each such virtual storage resource may comprise a RAID. Thus, in some embodiments, a virtual storage resource may comprise a redundant array of physical storage resources. In the same or alternative embodiments, a virtual storage resource may be implemented using a RAID standard. Although FIG. 1 depicts storage resource 110 internal to information handling system 102, in some embodiments, storage resource 110 may be external to information handling system 102 (e.g., embodied by a physical array of external hard disk drives).

In addition to processor 103, memory 104, storage controller 106, network interface 108, and storage resource 110, information handling system 102 may include one or more other information handling resources.

Network 160 may be a network and/or fabric configured to couple information handling systems 102 to each other. In some embodiments, network 160 may include a communication infrastructure, which provides physical connections, and a management layer, which organizes the physical connections and information handling systems communicatively coupled to network 160. Network 160 may be implemented as, or may be a part of, a storage area network (SAN), a PAN, a LAN, a metropolitan area network (MAN), a WAN, a wireless local area network (WLAN), a virtual private network (VPN), an intranet, the Internet or any other appropriate architecture or system that facilitates the communication of signals, data and/or messages (generally referred to as data). Network 160 may transmit data using any storage and/or communication protocol, including without limitation, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 160 and its various components may be implemented using hardware, software, or any combination thereof.

In addition to information handling systems 102 and network 160, system 100 may include one or more other information handling resources.

In operation, failover data transfer protocol 120 may use Transport Communications Protocol/Internet Protocol or other transport layer/Internet layer protocol to facilitate communication between peers (e.g., between information handling systems 102) including exchange of a shared secret for future communications between peers. Failover data transfer protocol 120 may be invoked in response to a command or instruction to copy data between information handling systems 102. In some embodiments, failover data transfer protocol 120 may be invoked in response to such a command or instruction also including a variable or flag set indicating that the command or instruction is to execute with failover protection. When a copy of data between information handling systems 102 is initiated using failover data transfer protocol 120 (e.g., as opposed to another application layer data transfer protocol 118), failover data transfer protocol 120 may execute calls with a file system of storage resource 110 to fetch file system metadata (e.g., inodes or other indexes to the stored data, data offsets or addresses, etc.) and pass such information to intelligent data manager 122 of storage controller 106. After receiving the metadata regarding a block or other unit of data to copy, intelligent data manager 122 may construct its own controller mega-data for the portion of data which may include a job identifier for the copy, one or more indexes (e.g., addresses or offsets) to metadata of the unit of data as stored on storage resource 110, one or more indexes (e.g., addresses or offsets) to the data of the unit as stored on storage resource 110, and/or other metadata regarding the data stored on a storage resource 110 to be copied.

Upon receipt of controller mega-data, intelligent data manager 122 may undertake copying of data between information handling systems 102 independent of operating systems 116 executing on either information handling system 102. Intelligent data manager 122 may cache controller mega-data in its local data for future reference, and may read, based on indexes of the controller mega-data, the metadata stored on storage resource 110, construct datagrams (e.g., network packets or network frames) comprising the controller mega-data and the stored metadata, and communicate such datagrams to the target information handling system 102. Similarly, intelligent data manager 122 may also, based on indexes of the controller mega-data, read the data stored on storage resource 110, construct datagrams (e.g., network packets or network frames) comprising the stored data, and communicate such datagrams to the target information handling system 102.

Figure 2A:
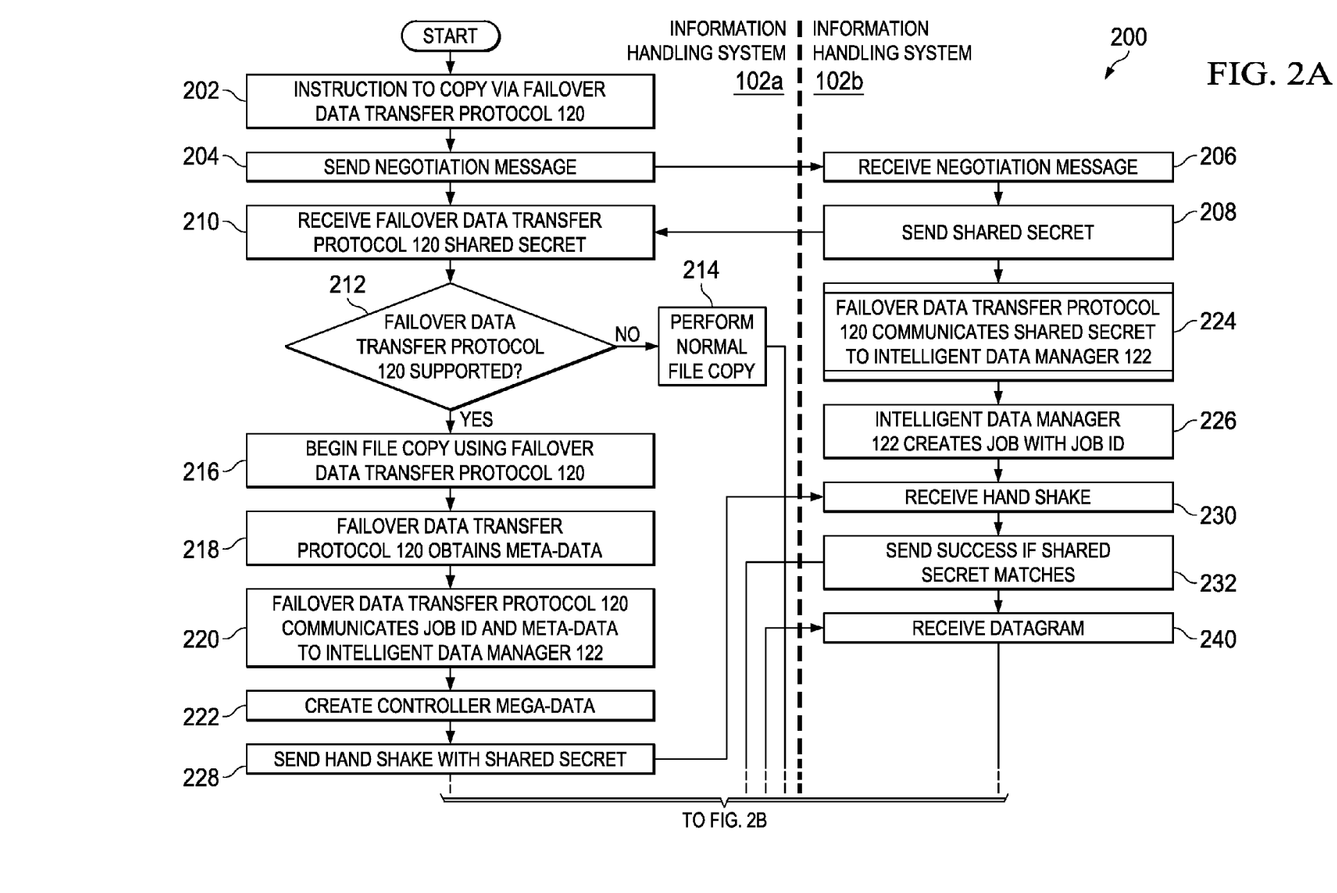
FIGS. 2A and 2B illustrate a flow chart of an example method for offloading of a bulk data transfer, in accordance with embodiments of the present disclosure.
Figure 2B:
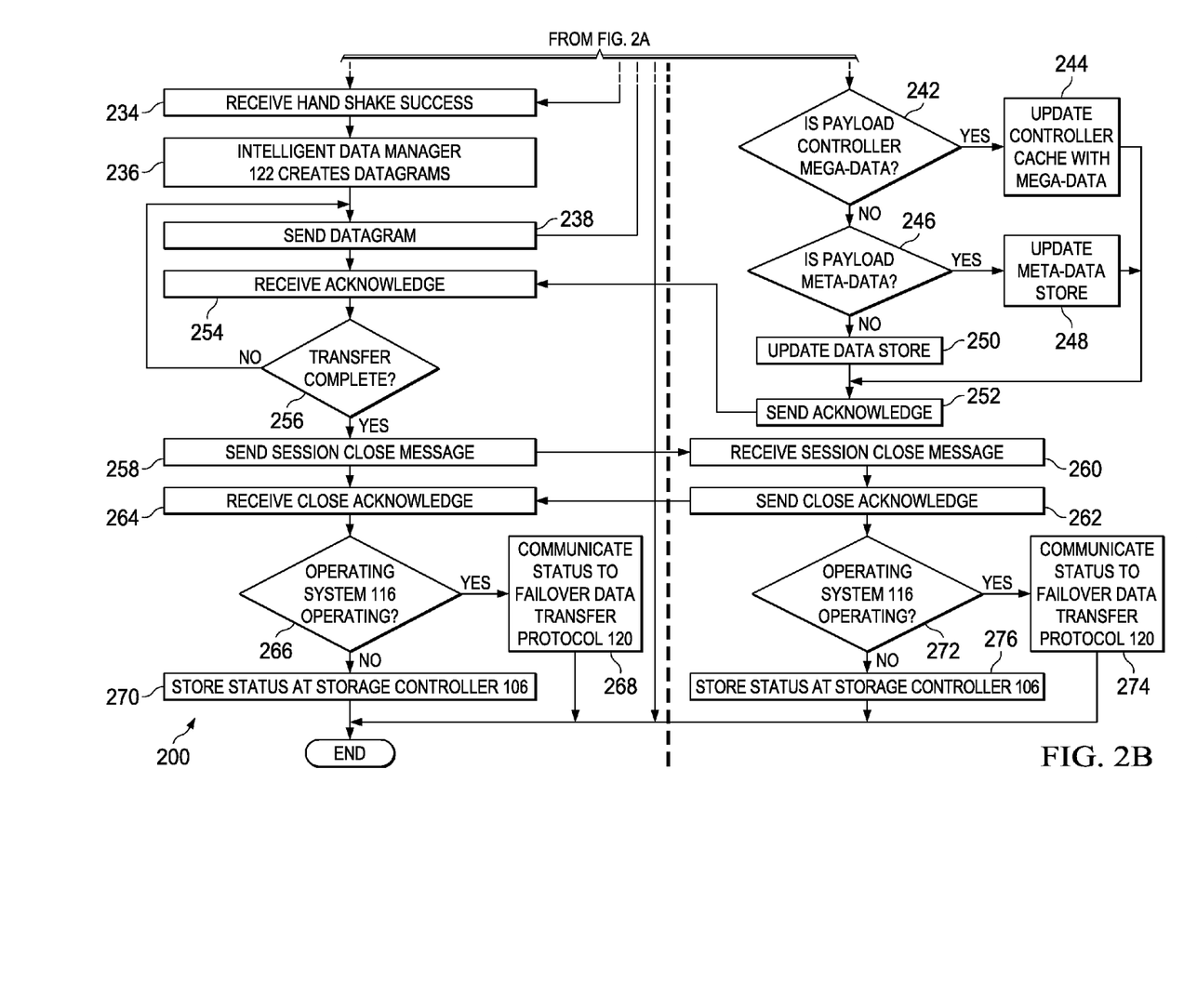

FIGS. 2A and 2B illustrate a flow chart of an example method 200 for offloading of a bulk data transfer, in accordance with embodiments of the present disclosure. According to some embodiments, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

At step 202, an instruction may be issued on information handling system 102a (e.g., by operating system 116 or an application executing thereon) to perform a copy of data to information handling system 102b using failover data transfer protocol 120. At step 204, in response, failover data transfer protocol 120 of information handling system 102a may send a message to information handling system 102b (e.g., via network interface 108 and network 160), and at step 206, failover data transfer protocol 120 of information handling system 102b may receive such message. At step 208, in response, failover data transfer protocol 120 of information handling system 102b may send a shared secret (e.g., password or other code) for failover data transfer protocol communication, and at step 210, failover data transfer protocol 120 of information handling system 102a may receive the shared secret.

At step 212, failover data transfer protocol 120 of information handling system 102a may determine if file data transfer protocol copy is supported between information handling systems 102a and 102b. If file data transfer protocol copy is not supported, method 200 may proceed to step 214. Otherwise, method 200 may proceed to step 216.

At step 214, in response to file data transfer protocol copy not being supported, information handling system 102a may copy the data to information handling system 102b via traditional approaches (e.g., via application layer data transfer protocol 118). After completion of step 214, method 200 may end.

At step 216, in response to file data transfer protocol copy being supported, information handling system 102a may begin the process of copying the data to information handling system 102b via failover data transfer protocol. At step 218, failover data transfer protocol 120 of information handling system 102a may read storage resource 110 of information handling system 102a to obtain metadata (e.g., identifying information of inodes) regarding the data to be copied.

At step 220, file data transfer protocol copy being supported, information handling system 102a may communicate a job identifier and the metadata to intelligent data manager 122 of information handling system 102a. At step 222, in response, intelligent data manager 122 of information handling system 102a may create controller mega-data based on the job identifier and the metadata.

At step 224, in response to negotiating the shared secret at step 208, failover data transfer protocol 120 of information handling system 102b may communicate to intelligent data manager 122 of information handling system 102b the negotiated shared secret. At step 226, intelligent data manager 122 of information handling system 102b may create a job with the job identifier in order to process the copy request. One or more of steps 224 and 226 may execute before, after, or contemporaneously with steps 216-222.

At step 228, intelligent data manager 122 of information handling system 102a may communicate to intelligent data manager 122 of information handling system 102b (e.g., via network interfaces 108 and network 160) a handshake message with the shared secret. At step 230, intelligent data manager 122 of information handling system 102b may receive and process the handshake message. At step 232, intelligent data manager 122 of information handling system 102b may reply to intelligent data manager 122 of information handling system 102a with a "success" message if the shared secret matches the negotiated shared secret. At step 234, intelligent data manager 122 of information handling system 102a may receive the handshake success message.

At step 236, intelligent data manager 122 of information handling system 102a may create datagrams (e.g., packets, frames) including the controller mega-data, metadata (e.g., inode and data indexes) associated with the data to be copied, and the data to be copied. At step 238, intelligent data manager 122 of information handling system 102a may communicate a datagram to intelligent data manager 122 of information handling system 102b (e.g., via network interfaces 108 and network 160) and, at step 240, intelligent data manager 122 of information handling system 102b may receive the datagram.

At step 242, intelligent data manager 122 of information handling system 102b may determine if the payload of the datagram is controller mega-data. If the payload is controller mega-data, method 200 may proceed to step 244. Otherwise, method 200 may proceed to step 246. At step 244, in response to the payload being controller mega-data, intelligent data manager 122 of information handling system 102b may update a cache of storage controller 106 of information handling system 102b with the controller mega-data. After completion of step 244, method 200 may proceed to step 252.

At step 246, intelligent data manager 122 of information handling system 102b may determine if the payload of the datagram is metadata associated with the copied data. If the payload is metadata, method 200 may proceed to step 248. Otherwise, method 200 may proceed to step 250. At step 248, in response to the payload being metadata, intelligent data manager 122 of information handling system 102b may update an on-disk metadata store of storage resource of information handling system 102b with the metadata. After completion of step 248, method 200 may proceed to step 252.

At step 250, in response to the payload comprising data, intelligent data manager 122 of information handling system 102b may update an on-disk data store of storage resource 110 of information handling system 102b with the data.

At step 252, following completion of processing of the datagram, intelligent data manager 122 of information handling system 102b may communicate an acknowledge message. At step 254, intelligent data manager 122 of information handling system 102a may receive the acknowledge message.

At step 256, in response to receiving the acknowledge message, intelligent data manager 122 of information handling system 102a may determine whether the copy is complete. If the copy is complete, method 200 may proceed to step 258. Otherwise, method 200 may proceed again to step 238.

At step 258, in response to determining that the copy operation is complete, intelligent data manager 122 of information handling system 102a may send a session close message to intelligent data manager 122 of information handling system 102b (e.g., via network interfaces 108 and network 160). At step 260, intelligent data manager 122 of information handling system 102b may receive and process the session close message. At step 262, intelligent data manager 122 of information handling system 102b may reply to intelligent data manager 122 of information handling system 102a with a close acknowledge. At step 264, intelligent data manager 122 of information handling system 102a may receive the session close message.

At step 266, in response to receiving the close acknowledge message, intelligent data manager 122 of information handling system 102a may determine if operating system 116 of information handling system 102a is operating (e.g., not down, crashed, hanging, etc.). If operating system 116 is operating, method 200 may proceed to step 268. Otherwise, method 200 may proceed to step 270.

At step 268, in response to determining that operating system 116 is operating, intelligent data manager 122 of information handling system 102a may communicate to failover data transfer protocol 120 with a status indicating that the copy is complete. After completion of step 268, method 200 may end.

At step 270, in response to determining that operating system 116 is not operating, intelligent data manager 122 of information handling system 102a may store the status indicating that the copy is complete at storage controller 106 of information handling system 102a, for communication to failover data transfer protocol 120 when operating system 116 is again operational. After completion of step 270, method 200 may end.

At step 272, in response to sending the close acknowledge message, intelligent data manager 122 of information handling system 102b may determine if operating system 116 of information handling system 102b is operating (e.g., not down, crashed, hanging, etc.). If operating system 116 is operating, method 200 may proceed to step 274. Otherwise, method 200 may proceed to step 276.

At step 274, in response to determining that operating system 116 is operating, intelligent data manager 122 of information handling system 102b may communicate to failover data transfer protocol 120 with a status indicating that the copy is complete. After completion of step 274, method 200 may end.

At step 276, in response to determining that operating system 116 is not operating, intelligent data manager 122 of information handling system 102b may store the status indicating that the copy is complete at storage controller 106 of information handling system 102b, for communication to failover data transfer protocol 120 when operating system 116 is again operational. After completion of step 276, method 200 may end.

It is noted that any of steps 272-276 may execute before, after, or contemporaneously with steps 266-270.

Although FIGS. 2A and 2B disclose a particular number of steps to be taken with respect to method 200, method 200 may be executed with greater or fewer steps than those depicted in FIGS. 2A and 2B. In addition, although FIGS. 2A and 2B disclose a certain order of steps to be taken with respect to method 200, the steps comprising method 200 may be completed in any suitable order.

Method 200 may be implemented using system 100 or any other system operable to implement method 200. In certain embodiments, method 200 may be implemented partially or fully in software and/or firmware embodied in computer-readable media.

Figure 3A:
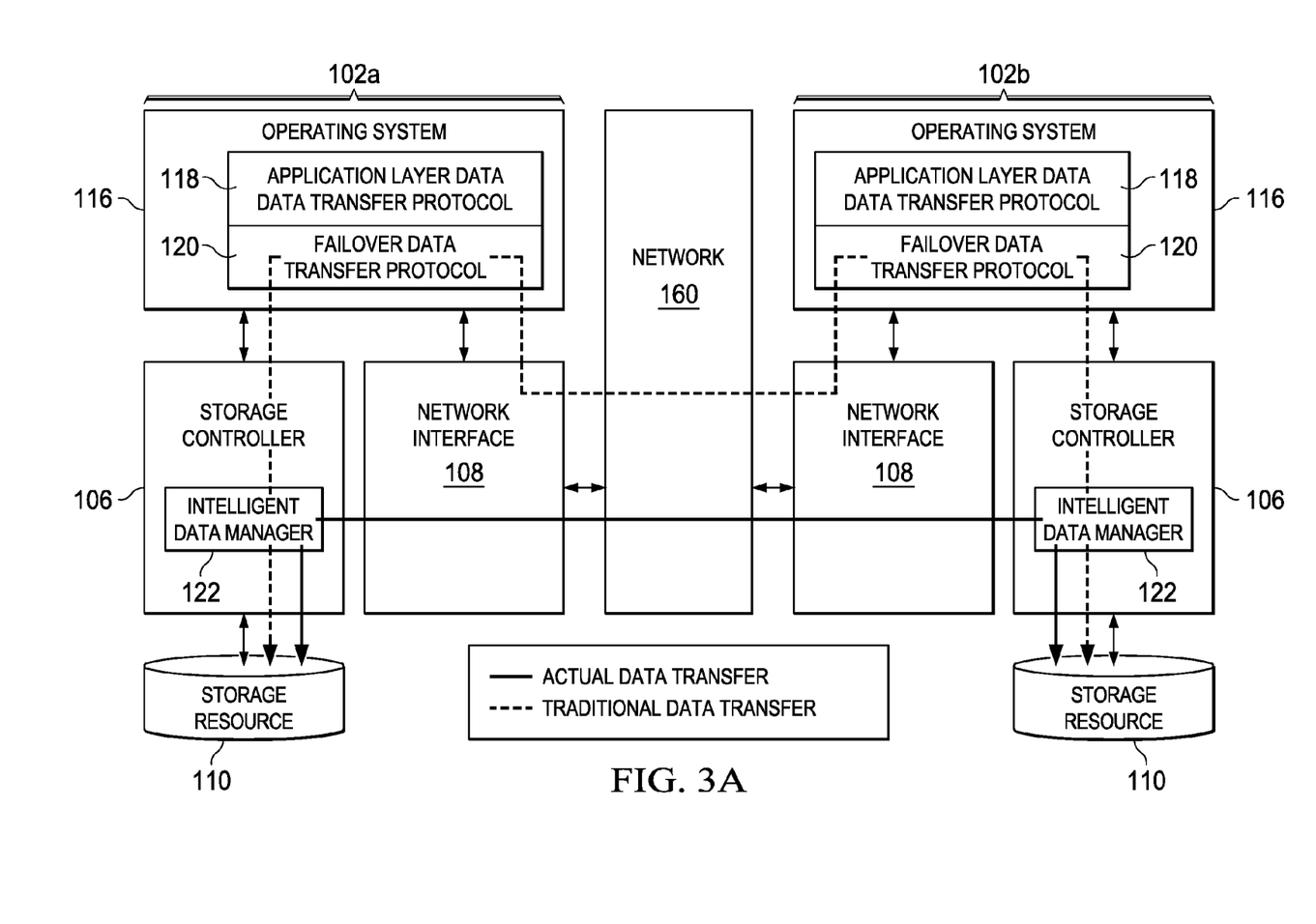
FIGS. 3A-3C each show an example use case scenario for the systems and methods disclosed herein, in accordance with embodiments of the present disclosure.
Figure 3B:
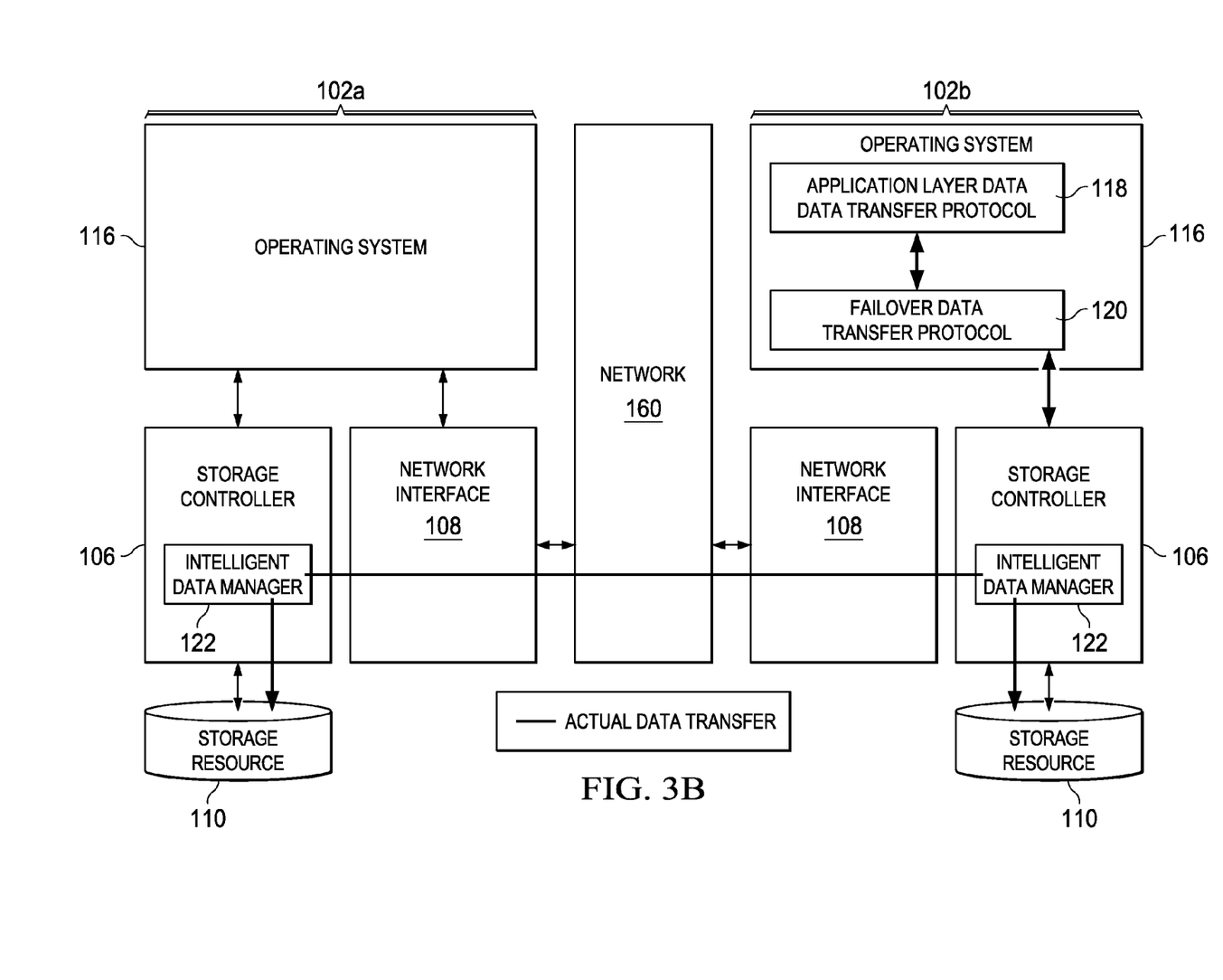
Figure 3C:
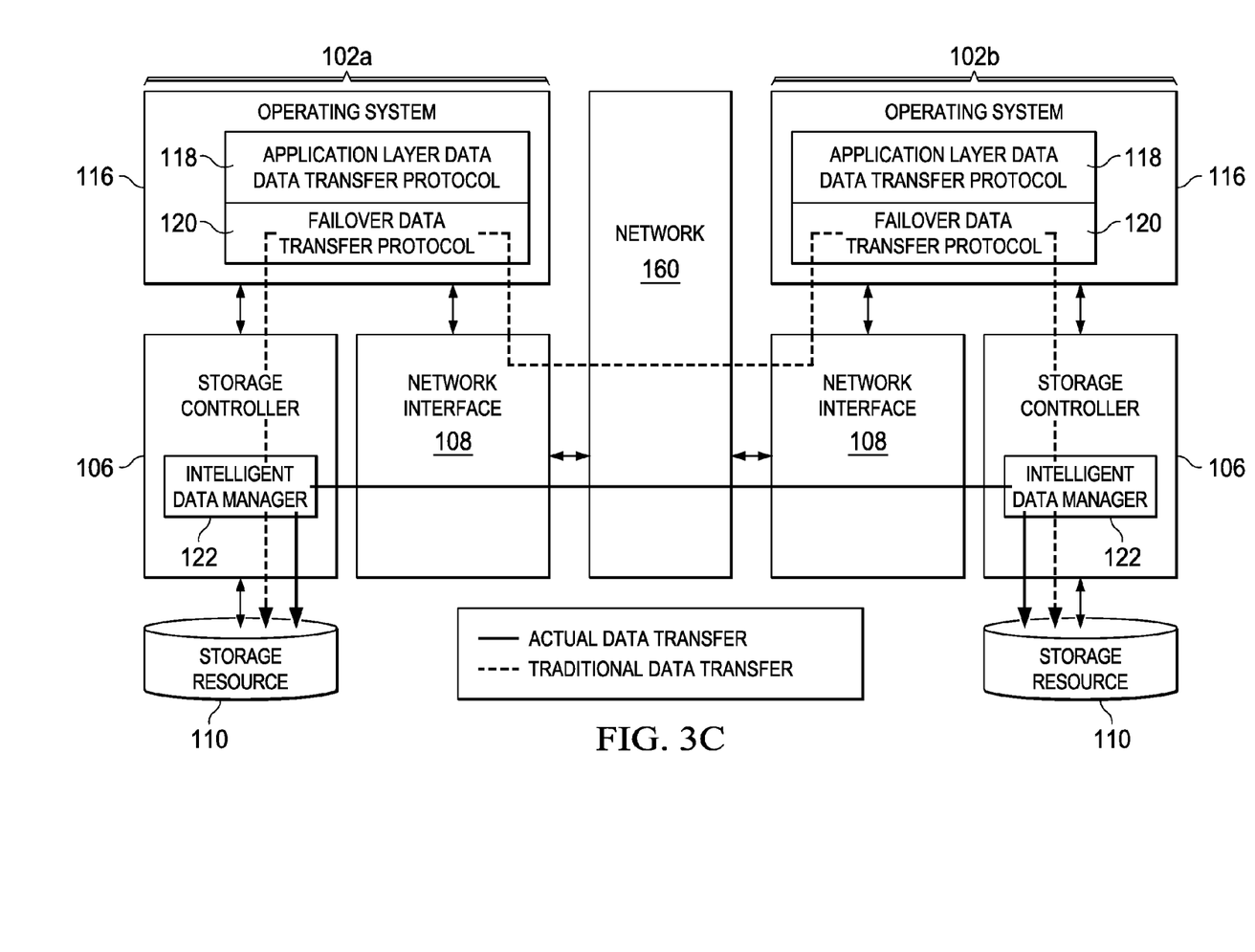

FIGS. 3A-3C each show an example use case scenario for the systems and methods disclosed herein, in accordance with embodiments of the present disclosure. In FIG. 3A, an operating system 116 executing on primary information handling system 102a may fail, hang, crash, or experience another fault. In such scenario, when a bulk data copy is initiated by operating system 116 executing on primary information handling system 102a, failover data transfer protocol 120 may export bulk file statistics to intelligent data manager 122. Intelligent data manager 122 may continue the bulk file transfer to secondary information handling system 102b on behalf of primary information handling system 102a. Here, intelligent data managers of both information handling systems 102 negotiate and continue communication, and intelligent data manager of primary information handling system 102a converts the network application protocol requests of information handling system of primary information handling system 102a into controller mega-data and begins communication with operating system 116 of secondary information handling system 102b.

In FIG. 3B, operating system 116 executing on primary information handling system 102a may be completely down. In such scenario, because storage controller 106 of primary information handling system 102a may bring up network interface 108 of primary information handling system 102a, and peer intelligent data manager 122 may transact with intelligent data manager 122 of primary information handling system 102a.

In FIG. 3C, when operating system 102a of primary information handling system 102a is heavily loaded it may start offloading bulk data transfer to its storage controller 106. Failover data transfer protocol 120 of primary information handling system 102a may intelligently offload bulk data transfer to storage controller 106 and storage controller 106 may continue the data transfer.

Using the methods and systems herein, many advantages over existing approaches to large bulk transfers of data may be realized. For example, the systems and methods herein may permit continuation and completion of a copy operation if an operating system initiating the copy operation were to fail, hang, or crash after initiation of the copy operation. As another example, if an operating system of an information handling system fails, an intelligent data manager of such information handling system may be configured to enable a network interface of the information handling system such that a storage controller of the information handling system can transact with other information handling systems via a network. As a further example, when an operating system of an information handling system is heavily loaded, it may offload all or a portion of its data transfer to a storage controller of the information handling system, allowing the operating system to execute other tasks free of the processing resources needed to facilitate the transfer.

Figure 4:
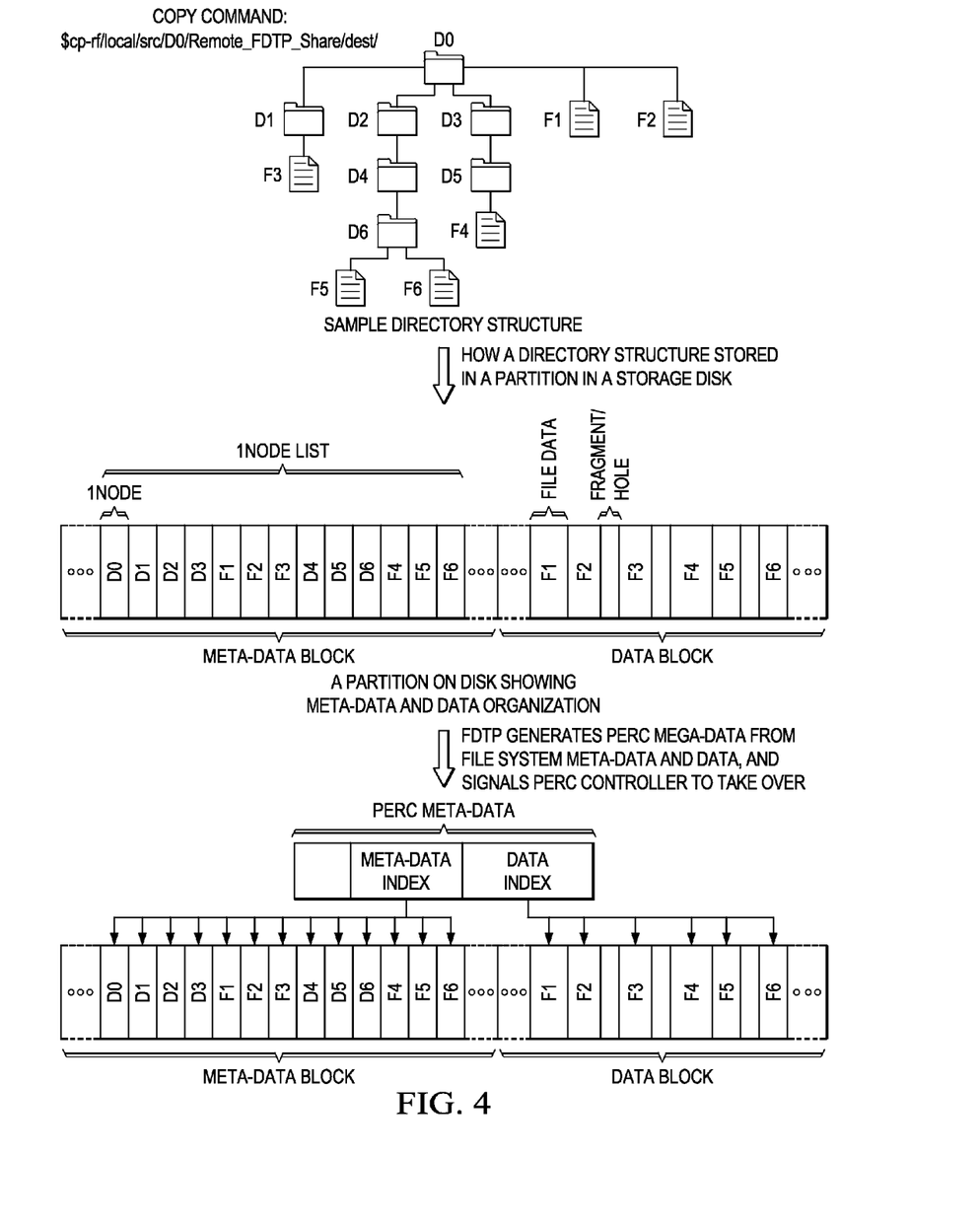
FIG. 4 depicts generation of controller mega-data from a file system of an information handling system, in accordance with embodiments of the present disclosure.

FIG. 4 depicts generation of controller mega-data from a file system of a primary information handling system 102a, in accordance with embodiments of the present disclosure.

Figure 5:
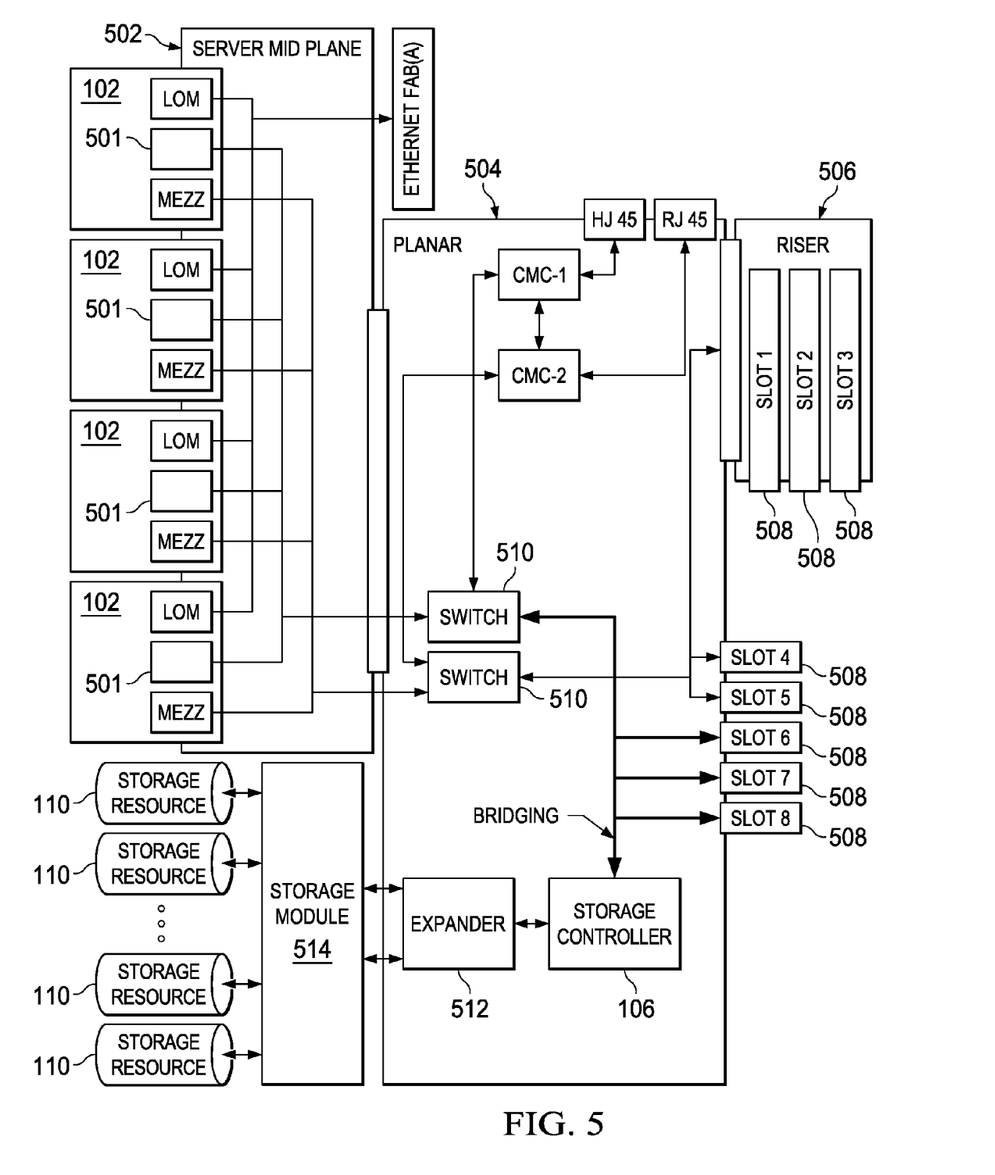
FIG. 5 depicts an implementation of a chassis including multiple modular information handling systems and bridging between a storage controller and network interfaces of the chassis, in accordance with embodiments of the present disclosure.

FIG. 5 depicts an implementation of a chassis including multiple modular information handling systems 102 and bridging between a storage controller 106 and network interfaces of the chassis. As shown in FIG. 5, multiple modular information handling systems, each having a mezzanine switch 501 (e.g., a PCIe mezzanine switch) which may couple to a server midplane 502. The server midplane 502 may coupled to a system planar, upon which slots 508 (e.g. PCIe slots) may reside or may be coupled to via a riser 506. System planar 504 may also include storage controller 106, switches (e.g., PCIe switches) and a storage expander 512 (e.g., a SAS expander). Storage resources 110 may be coupled via a storage midplane 514 to storage expander 512. The bold line in FIG. 5 depicts the bridging between a storage controller 106 and network interfaces that may occur when an operating system of one of the modular information handling systems 102 is down, the bridging creating bridges among storage controller 106 planar switches 510 coupled mezzanine switches 501, and to slots 508.

Figure 6:
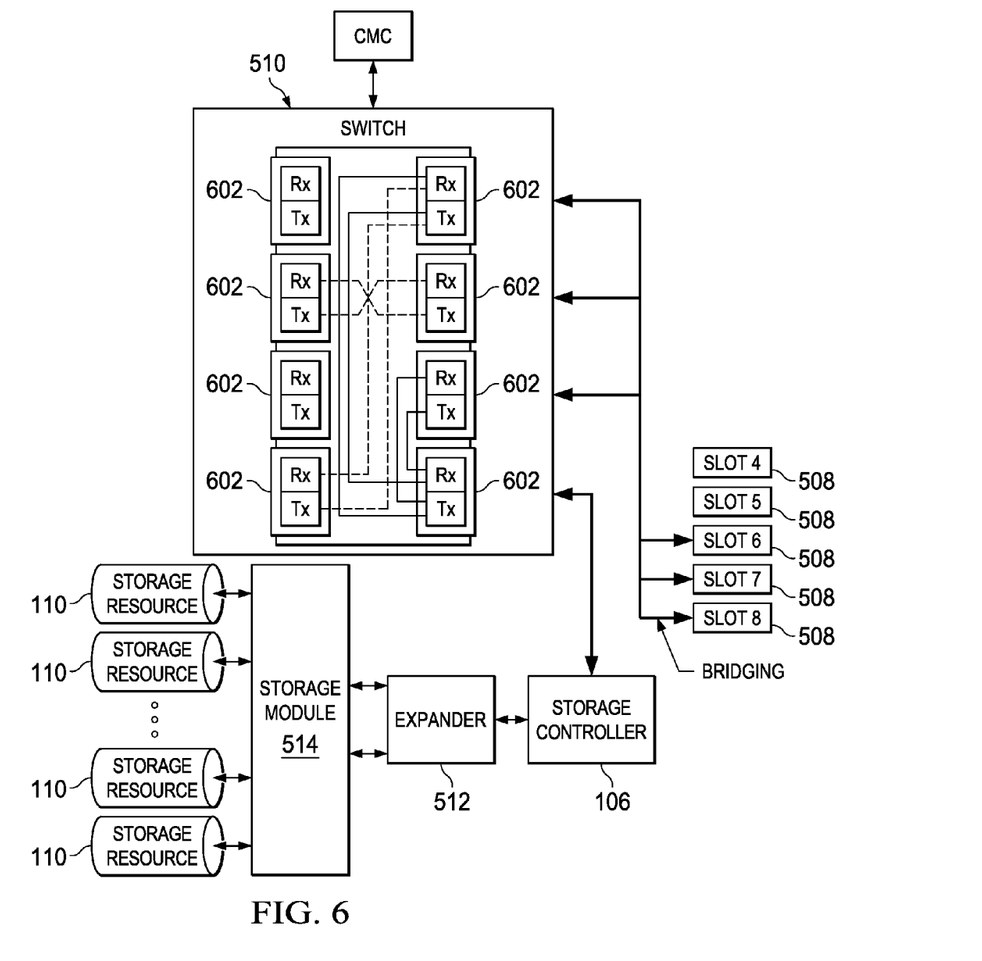
FIG. 6 depicts a greater detailed view of the bridging of FIG. 5, in accordance with embodiments of the present disclosure.

FIG. 6 depicts a greater detailed view of the bridging of FIG. 5. Also as shown in FIG. 6, switch 510 may comprise a quad Ethernet switch with multiple ports 602. Dotted lines in switch 510 depict data flow when an operating system 116 of an information handling system 102 is up, and the solid lines in switch 510 depict data flow when such an operating system 116 is down.

Figure 7:
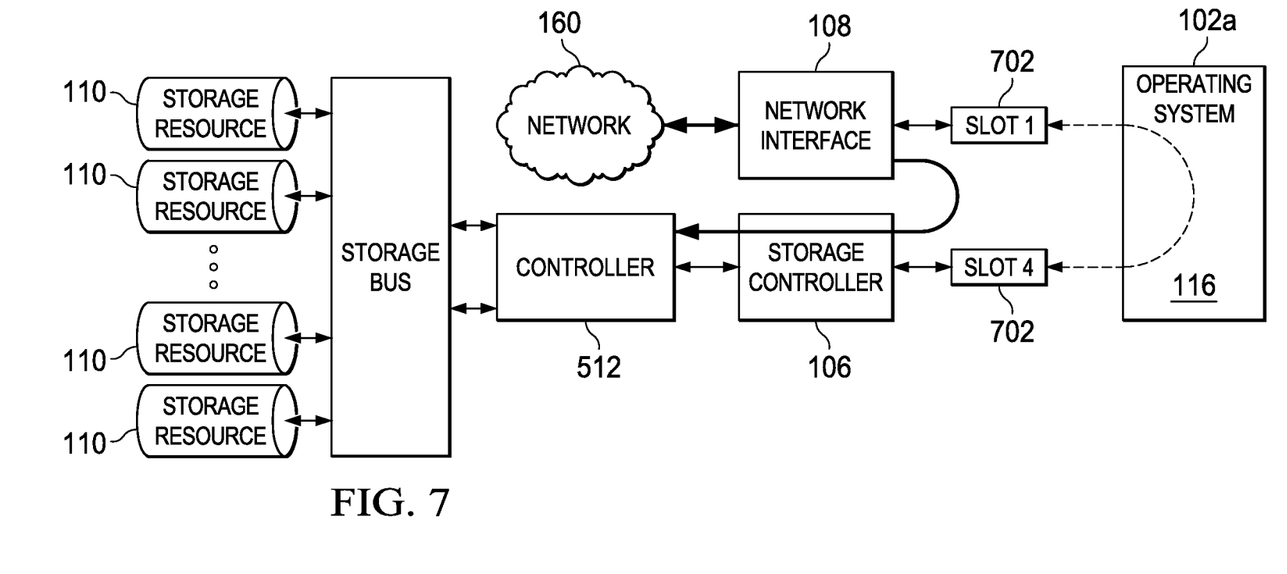
FIG. 7 depicts an implementation of a monolithic server information handling system and interface between a storage controller and network interface of such information handling system, in accordance with embodiments of the present disclosure.

FIG. 7 depicts an implementation of a monolithic server information handling system 102 and interface between a storage controller 106 and network interface 108 of the information handling system 102. Dotted lines depict data flow when an operating system 116 of an information handling system 102 is up, and the solid lines depict data flow when such an operating system 116 is down. Thus, when an operating system 116 is down, storage controller 106 may interface directly with network interface 108, thus bypassing slots 702 coupled to primary information handling system 102a.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
a processor;
a non-transitory, computer-readable medium having stored thereon a program of instructions implementing an application-level protocol, the program of instructions configured to, when read and executed by the processor:
responsive to a command to copy data from the information handling system to a second information handling system communicatively coupled to the information handling system via a network, retrieve file system metadata of a storage resource of the information handling system; and
communicate the file system metadata to a physical storage controller communicatively coupled to the processor; and
the physical storage controller, wherein the physical storage controller is configured to:
receive the file system metadata;
construct controller mega-data from the file system metadata;
based on the controller mega-data, construct a plurality of datagrams comprising one or more of the controller mega-data, the file system metadata, and the data to be copied from the information handling system to the second information handling system; and
communicate the plurality of datagrams to a second physical storage controller of the second information handling system independent from any operating system executed on the information handling system; and wherein:
the command to copy the data is initiated via a particular operating system executing on the information handling system; and in response to a crash of the particular operating system occurring prior to completion of the communicating the plurality of datagrams, the physical storage controller is configured to continue communicating the plurality of datagrams.

2. The information handling system of claim 1, wherein the file system metadata comprises at least one of an index to other metadata regarding the data and an index to the data.

3. The information handling system of claim 1, wherein the controller mega-data comprises a job identifier and the file system metadata.

4. The information handling system of claim 1, wherein the program of instructions is further configured to negotiate with a second application-level protocol of the second information handling system for communication of the data independent of any operating system of the information handling system.

5. The information handling system of claim 4, wherein negotiation comprises negotiating a shared secret for communication of the data.

6. The information handling system of claim 5, wherein the physical storage controller is configured to perform a handshake with the second physical storage controller using the shared secret prior to communication of the plurality of datagrams.

7. A method comprising:
responsive to a command to copy data from an information handling system to a second information handling system communicatively coupled to the information handling system via a network, retrieving, by an application-level protocol, file system metadata of a storage resource of the information handling system;
communicating the file system metadata to a physical storage controller;
constructing, by the physical storage controller, controller mega-data from the file system metadata;
based on the controller mega-data, constructing, by the physical storage controller, a plurality of datagrams comprising one or more of the controller mega-data, the file system metadata, and the data to be copied from the information handling system to the second information handling system; and
communicating, by the physical storage controller, the plurality of datagrams to a second physical storage controller of the second information handling system independent from any operating system executed on the information handling system; and wherein:
the command to copy the data is initiated via a particular operating system executing on the information handling system; and
in response to a crash of the particular operating system occurring prior to completion of the communicating the plurality of datagrams, the physical storage controller is configured to continue communicating the plurality of datagrams.

8. The method of claim 7, wherein the file system metadata comprises at least one of an index to other metadata regarding the data and an index to the data.

9. The method of claim 7, wherein the controller mega-data comprises a job identifier and the file system metadata.

10. The method of claim 7, further comprising negotiating, by the application-level protocol, with a second application-level protocol of the second information handling system for communication of the data independent of any operating system of the information handling system.

11. The method of claim 10, wherein negotiation comprises negotiating a shared secret for communication of the data.

12. The method of claim 11, further comprising performing, by the physical storage controller, a handshake with the second physical storage controller using the shared secret prior to communication of the plurality of datagrams.

13. A physical storage controller comprising hardware circuitry, the physical storage controller being configured to:
in connection with a command to copy data from an information handling system to a second information handling system communicatively coupled to the information handling system via a network, receive file system metadata of a storage resource of the information handling system from an application-level protocol executing on the information handling system, the information handling system including the physical storage controller;
construct controller mega-data from the file system metadata;
based on the controller mega-data, construct a plurality of datagrams comprising one or more of the controller mega-data, the file system metadata, and the data to be copied from the information handling system to the second information handling system; and
communicate the plurality of datagrams to a second physical storage controller of the second information handling system independent from any operating system executed on the information handling system; and wherein:
the command to copy the data is initiated via a particular operating system executing on the information handling system; and
in response to a crash of the particular operating system occurring prior to completion of the communicating the plurality of datagrams, the physical storage controller is configured to continue communicating the plurality of datagrams.

14. The physical storage controller of claim 13, wherein the file system metadata comprises at least one of an index to other metadata regarding the data and an index to the data.

15. The physical storage controller of claim 13, wherein the controller mega-data comprises a job identifier and the file system metadata.

16. The physical storage controller of claim 13, the physical storage controller further configured to perform a handshake with the second physical storage controller using a shared secret prior to communication of the plurality of datagrams, wherein the shared secret was negotiated between the application-level protocol and a second application-level protocol of the second information handling system.

* * * * *